Feb. 10, 1970  W. TRENKLER  3,494,659
PASSENGER VEHICLE REMOVABLE TOP
Filed May 10, 1967  3 Sheets-Sheet 1

INVENTOR
Werner TRENKLER by Licke + Craig
ATTORNEYS

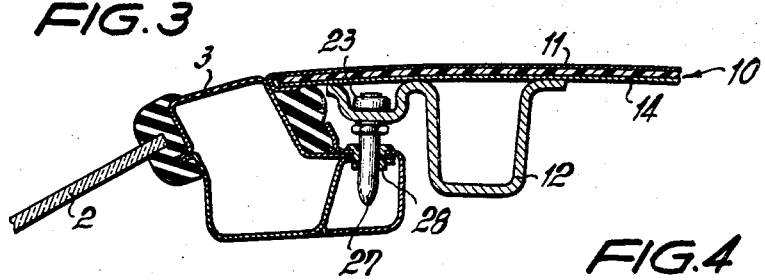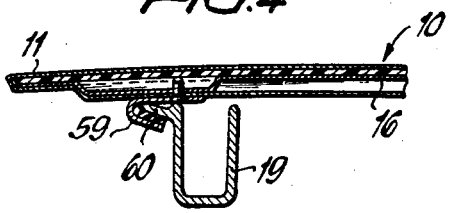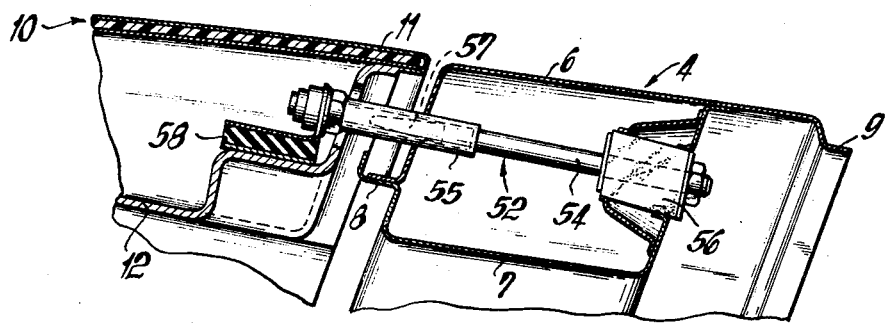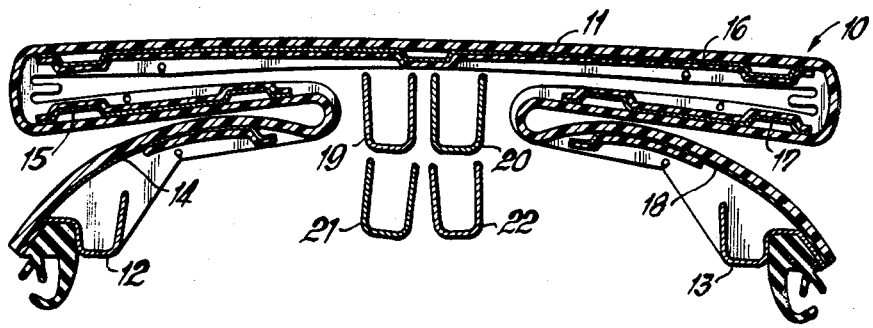

Feb. 10, 1970  W. TRENKLER  3,494,659
PASSENGER VEHICLE REMOVABLE TOP
Filed May 10, 1967  3 Sheets-Sheet 3

INVENTOR
Werner TRENKLER
BY
ATTORNEYS

United States Patent Office 3,494,659
Patented Feb. 10, 1970

3,494,659
PASSENGER VEHICLE REMOVABLE TOP
Werner Trenkler, Im Taschen 2,
Asperg, Kreis Ludwigsburg, Germany
Filed May 10, 1967, Ser. No. 637,448
Int. Cl. B60j 7/10
U.S. Cl. 296—137                              29 Claims

ABSTRACT OF THE DISCLOSURE

The present disclosure relates to a removable and collapsible vehicle top that is rigidly connected to the windshield frame and resiliently connected to the transverse roll yoke. The cover comprises a plurality of rigid sheet metal portions foldable into overlying relationship and connected together by means of a pliable top covering. The forward connections include longitudinal abutments and latches comprising clamping hooks that may be moved into and out of clamping engagement with the windshield frame and safety hooks that will prevent vertical lifting of the cover should the clamping hooks fail. The covering is extended and collapsed by means of over center longitudinally extending tension members that automatically interengage with the reinforcing sheets upon extension.

---

It is known in the prior art to provide a passenger motor vehicle, particularly a sports car, with a roll bar or yoke for the safety of the passengers. This roll yoke has also been used for supporting the roof portions that are detachably fastened to the windshield frame and the roll yoke.

The present invention relates to such a covering that is detachably fastened to the windshield frame and the roll yoke to completely cover the passenger compartment. The improvement of the present invention lies in the specific construction of the cover and its connections with the windshield frame and roll yoke.

According to the present invention, the covering is rigidly fastened to the windshield frame and yieldingly fastened to the roll yoke. In this manner, the very high differential in pressure between the inside and outside surfaces of the covering will not adversely affect the covering, particularly in the case of sports cars. Thus, undesirable lifting and possibly detachment of the covering is avoided during operation of the vehicle. The elastic connection or yielding connection between the covering and the roll yoke allows twisting of the vehicle structure without stressing the covering, so that a stiffer covering of pliable material may be used than has heretofore been used in the prior art. Furthermore, the windshield frame is not stressed thereby. The unyielding connection between the covering and windshield frame is formed by means of clamping latches and separate longitudinally engaging abutments to constitute separate force closing and form closing means; with these means, the edge of the covering that is directly subjected to the pressure differential is secured at spaced intervals against shifting or lifting. Additionally, the form closing means will engage first to center the covering for the exact subsequent engagement of the force closing means. In an advantageous manner, the form closing means will provide a connection between the windshield frame and covering within the region of the opposite side edges of the windshield frame and covering. The form closing means will consist of a pin and a bushing, which are rigidly fastened at the covering and windshield frame, respectively.

The force closing means comprises two locks or latches that are symmetrically arranged on the covering with respect to the longitudinal central plane of the vehicle. With such an arrangement, the remaining portions of the roof are free from projections or the like that would be dangerous to the vehicle passengers. Each of the latches is provided with separate and independent clamping and safety hooks, for cooperation with the windshield frame. By means of such a double vertical engagement between the covering and vehicle body, a high safety factor is obtained with regard to an inadvertent loosening or lifting of the covering with respect to the vehicle body. Each of the latches is provided with an operating lever for moving, through the interposition of a shaft and cams, a latch arm for aligning and clamping the clamping hook, and withdrawing from alignment the clamping and safety hooks so that the covering may be removed easily.

The rearward fastening between the covering and roll yoke is accomplished by means of longitudinal and horizontally interengaging plug-in type connectors, which have a resilient mounting respectively to the cover and roll yoke to provide an elastic yielding connection. By this means, the assembly of the covering is considerably facilitated and the connection allows for limited relative movement between the covering and roll yoke. As a result, the twisting movements of the relatively rigid motor vehicle frame is isolated from the covering so that damage to the stiff covering and jamming or twisting of the connections is avoided. The plug-in type rear connection consists of a sleeve resiliently fastened to the covering and a bolt resiliently fastened to the roll yoke at the edge thereof remote from the central portion of the covering. With such a resilient connection between the bolt and roll yoke, the bolt may pivot to facilitate assembly. Also, assembly is facilitated by means of a conically tapered free end portion of the bolt.

The covering is provided with an outer pliable layer of sheet material and inner relatively rigid sheet metal reinforcements that extend along the entire sides of the top. The sides of the covering are provided with frame members that have attached thereto forward and rearward tension collapsible members or links to rigidly extend the top in their over-center position. The sheet metal reinforcements extend in the longitudinal direction of the vehicle and match the curvature of the roof and have therebetween hinge portions of the pliable sheet so that the covering may be folded and stored in the vehicle in the compact manner upon collapsing of the tension members.

The sheet metal reinforcements of the covering are connectable with the tension members by means of interengaging tongue and groove means automatically upon extension of the tension members to their over-center position. By this means, the top is prevented from lifting at high vehicle speeds and is provided with a firm and secure rest at its outer edges, while not unduly complicating the assembly and disassembly of the covering.

Further objects, features and advantages of the present invention will become more clear from the following detailed description of a preferred embodiment of the present invention in connection with the attached drawing, wherein:

FIGURE 3 is a partial cross-sectional view taken along line III—III of FIGURE 2, on an enlarged scale;

FIGURE 4 is a partial cross-sectional view taken along line IV—IV of FIGURE 2, on an enlarged scale;

FIGURE 5 is a partial cross-section view taken along line V—V of FIGURE 2, on an enlarged scale;

FIGURE 6 is a transverse cross-sectional view through the covering shown in its folded or collapsed position;

Figure 1:
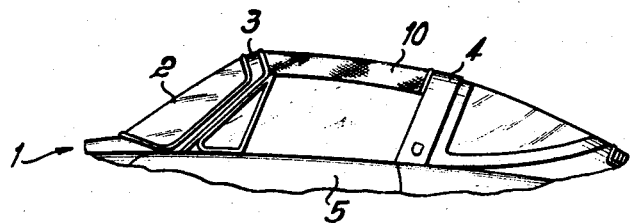
FIGURE 1 is a partial side elevation view of a passenger motor vehicle showing the top constructed according to the present invention.

As shown in FIGURE 1, the passenger motor vehicle 1 includes a front windshield 2 mounted in a conventional manner in a windshield frame 3. A roll bar or roll yoke 4 is provided rearwardly of the passenger compartment that is entered by means of the door 5. As shown more clearly in FIGURE 5, the roll yoke 4 is preferably constructed of two sheet metal stampings 6, 7 which are joined together by suitable means, for example, welding, to form a hollow transversely extending body provided with longitudinally overhanging edges 8, 9 for fastening to the sealing strips of the adjacent wall portions.

As shown in FIGURE 1, a covering 10 completely covers the passenger compartment and extends between the windshield frame 3 and the roll yoke 4.

The covering 10 is removably mounted and preferably constructed of a pliable outer sheet material with inside bracing that will allow folding. The specific covering construction allows folding and is an important feature of the invention.

Figure 2:
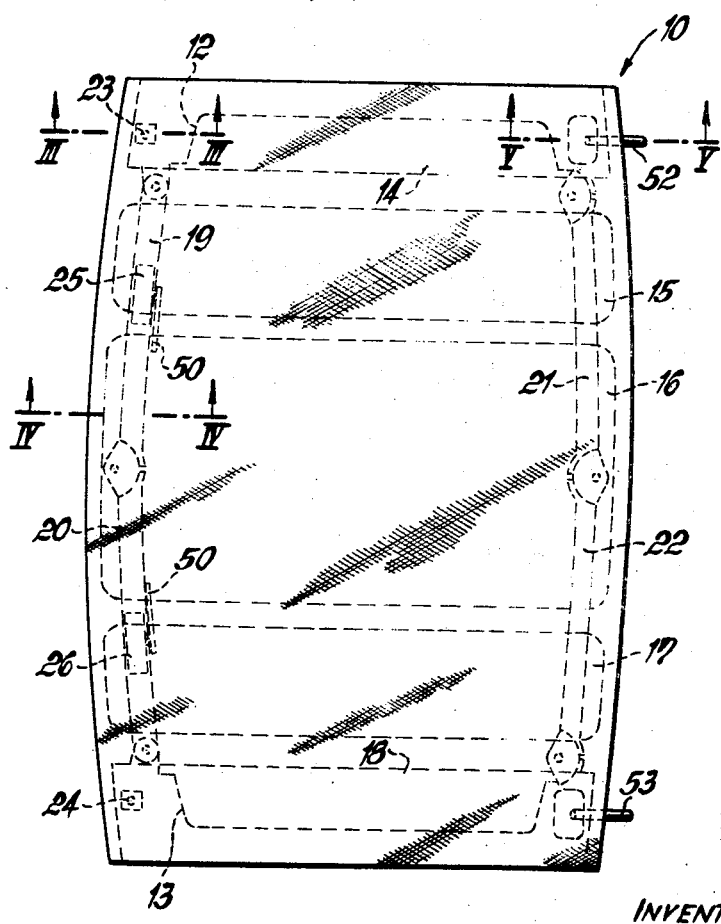
FIGURE 2 is a top view of the covering shown in FIGURE 1.

The covering 10 consists essentially of a pliable outer sheet covering 11 made of a synthetic leather or the like and a plurality of stable rigid reinforcements. The reinforcements include longitudinally extending frame members or struts 12, 13 on opposite sides of the covering constructed of shaped castings of light metal, and sheet metal stampings or reinforcement sheets 14, 15, 16, 17, and 18, which are connected with the pliable sheet 11. The reinforcement sheets 14 and 18 are secured to the frame members 12 and 13, respectively. The linkages or over-center tension members 19, 20 and 21, 22 are respectively pivoted together at their adjacent ends in an over-center fashion and pivoted at their opposite ends to the covering 10 so that they may be extended over-center to hold the top in its extended rigid position of FIGURE 2 or folded inwardly one over the other in a scissors-like manner to a collapsed or folded position of the top as shown in FIGURE 6.

The removable top 10 is fastened to the relatively rigid vehicle body in a rigid unyielding manner at the windshield frame 3 and in an elastic yielding manner to the roll yoke 4. The forward connection for the covering 10 includes longitudinally engaging abutments or pin connections 23, 24 and force applying latches or locks 25, 26, which are attached to the tension member 19, 20 and the windshield frame.

Each of the pin connections 23, 24 consists of a pin (FIGURE 3), which is rigidly secured to its respective frame member 12 as shown in FIGURE 3, and extends into a bushing or sleeve 28 that is rigidly secured to the windshield frame 3. The sleeve 28 includes a wear resistant synthetic material, for example, Virlkolan. The telescopic engagement of the pin 27 in the bushing 28 is accomplished essentially without clearance so that the covering 10 is accurately guided and positioned in the windshield frame 3 in the horizontal direction.

Figure 7:
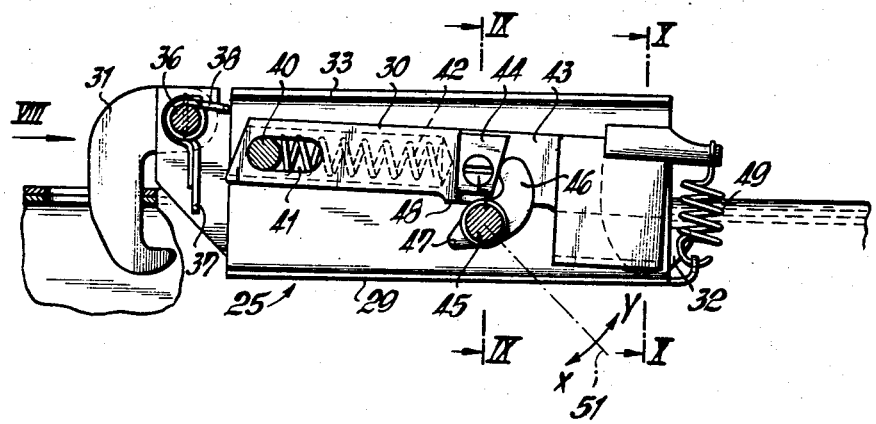
FIGURE 7 is a partial transverse view of one of the latches for securing the covering.
Figure 8:
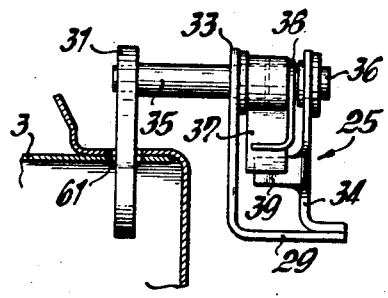
FIGURE 8 is a partial view taken in the direction of arrow R in FIGURE 7.
Figure 9:
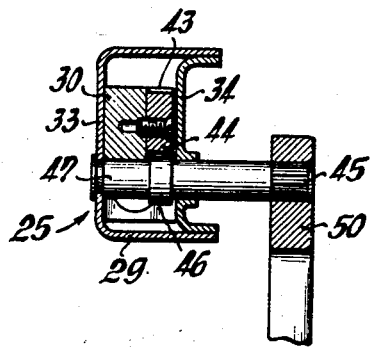
FIGURE 9 is a partial cross-sectional view taken along line IX—IX of FIGURE 7.

Each of the latches 25 and 26 are substantially mirror images of each other and latch 25 will be described in detail with regard to FIGS. 7–10. Latch 25 includes a sheet metal housing 29, a latch arm 30, a safety hook 31 and a clamping hook 32. The latch 25 is rigidly mounted within the U-shaped tension member 19, as only shown in FIGURE 10, for purposes of simplicity. The housing 29 is constructed from sheet metal stampings 33 and 34, which are rigidly connected together by welding or the like; in FIGURE 7, the sheet metal stamping 34 has been removed for purposes of illustration only. A pin 36 is freely rotatably mounted within the housing 29 and has a portion 35 extending outwardly and longitudinally forwardly of the housing 29 to rigidly carry on its outer end the safety hook 31. As shown in FIGURES 7 and 8, a plate 37 is rigidly secured to the pin portion 35 to form an abutment for one end of a spring 38 that has its other end secured to the housing 29 to bias the plate 37 and thus the safety hook 31 in a counter-clockwise direction (FIGURE 7) into abutment with a stop 39 that is formed by a bent portion of the stamping 34.

Figure 10:
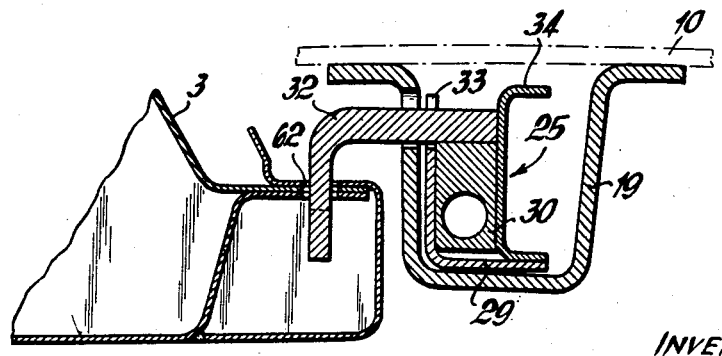
FIGURE 10 is a partial cross-sectional view taken along line X—X of FIGURE 7.

The latch arm 30 is mounted within the housing 29 and guided by means of the sheet metal stampings 33 and 34 for transverse movement and is secured for pivotal movement in a transverse vertical plane by means of the housing bolt 40 that has a lost motion connection with the latch arm 30 by means of the transversely elongated slot 41 in the latch arm. A coil spring 42 is contained within a hollow portion of the latch arm 30 and has one end engaging the bolt 40 and its opposite end engaging an internal surface of the latch arm 30. The spring 42 biases the latch arm transversely to the right as shown in FIGURE 7. The clamping hook 32 is rigidly secured to the latch arm 30 at its outer end as shown in FIGS. 7 and 10. An insert 44 is rigidly secured in a lateral recess 43 of the latch arm 30 for cooperation with an actuating or operating shaft 45. The shaft 45 is provided with a finger or stop 46 that will engage the insert 44 and move the latch arm 30 to the left (FIGURE 7) in opposition to the spring bias 42 upon rotation of the shaft 45 in one direction. The shaft 45 is further provided with a cam 47 that cooperates with a corresponding surface 48 of the latch arm 30. The latch arm is biased about the pivot bolt 40 in the clockwise direction as shown in FIG. 7 by means of the spring 49 extending between it and the housing 29. The shaft 45 is rigidly secured to a manual actuating handle 50 (FIGURE 9); the position of the handle 50 is indicated by the dotted line 51 in FIGURE 7 for the corresponding illustrated position of the shaft 45 so that the shaft and handle may be rotated in either the direction X or Y from the illustrated position.

The rearward connection for the covering 10 to the roll yoke 4 is accomplished by means of two longitudinally telescopically interengaging plug-in type connectors 52, 53, which consist of a bolt 54 and a sleeve 55 together with their respective mountings (FIGURE 5). Bolt 54 is resiliently fastened to the roll yoke 4 by means of the rubber bushing 56 in which the bolt is held so that the bolt 54 is swingable or pivotable within certain limits for purposes of alignment during assembly, and after assembly the bushing 56 is compressed. The bolt 54 is attached to the roll yoke 4 on its side opposite from the covering 10 and extends to a free conical forwardly tapered end for engagement with the correspondingly threaded sleeve 55 that is resiliently fastened to the frame member 12 by means of a laminated rubber-metal bearing pad 58. Connectors 52 and 53 are substantially identical; therefore, only one has been shown in detail.

FIGURE 6 illustrates a cross-sectional view of the covering 10 in its collapsed or folded position. The linkages 19, 20 and 21, 22 lie one over the other and may be provided with rests, snaps, locks or the like to hold them in this position. If the covering 11 is to be assembled with the vehicle from this storage position, the frame members 12 and 13 will be pulled apart from their illustrated position in FIGURE 6 to simultaneously extend the linkages 19, 20 and 21, 22 until they are in an outward over-center position where they are locked to rigidly hold the covering in its extended position. The over-center position of the linkages 19, 20 and 21, 22 prevents an inadvertent collapsing of the linkages and holds the top in its tensioned extended position. Means are provided for simultaneously connecting the sheet metal reinforcement stampings 15, 16, 17 automatically with the linkages 19, 20 and 21, 22 during the above described assembly process. For this purpose, a hook 59 is rigidly secured on each of the sheet metal reinforcement stampings 15, 16 and 17, to engage with an edge portion 60, for example of the linkage 19 during extension of the covering 11 (FIGURE 4). By this means, the stampings and thus the covering 11 are positively held from relative movement in the vertical direction and are provided with seals on their outside that will not lift even under high pressure differentials.

After the above described extension or unfolding of the covering 11, the tensioned or extended covering 11 is assembled onto the vehicle between the windshield frame 3 and the roll yoke 4. First, the sleeves 55 are assembled onto the bolts 54 (FIGURE 5) and the pins 27 are inserted into the bushings 28 (FIGURE 3); by this means, the covering 10 is aligned so that when it is lowered the hooks 31 and 32 of the latches 25, 26 will extend into the correspondingly formed openings or apertures 61, 62 provided in the windshield frame 3 (FIGURES 7-10). After this initial positioning, the manual lever 55 (its position schematically illustrated in FIGURE 7 by means of the line 51), is swung in the X direction into a horizontal position to simultaneously rotate the cam 47 and pivot the latch arm 30 about the bolt 40 to raise the clamping hook 32 against the lower surface of the edge portions of the opening 62 on the frame 3. Upon lowering the top, the safety hook 31 will first be cammed in a clockwise direction and thereafter snap into its illustrated safety position of FIGURE 7 under the influence of the spring 38.

To open the illustrated latch 25, the lever 50 is swung from its above described horizontal position into a position corresponding to line 51 to allow the clamping hook 32 to move downwardly out of engagement with the frame 3 under the influence of the spring 49. As soon as the lever 50 is moved beyond the position illustrated by line 51 in the direction Y, the finger 46 engages the insert 44 and transversely moves the latch arm 30 toward the center of the vehicle, that is, toward the left in the illustration of FIGURE 7. The first movement of the lever 50 from its horizontal position to the position 51 pivots the clamping hook 32 out of engagement with the frame 3 and the movement of the lever 50 from its position 51 in the Y direction will move the clamping hook 32 into a vertically aligned position with the hole 62 while simultaneously the latch arm 30 engages against the plate 37 to swing the plate 37 together with the safety hook 31 into a position vertically aligned with the opening 61 so that thereafter the covering 11 may be readily disassembled by lifting it vertically without obstruction.

The above preferred embodiment has been illustrated and described only as a preferred embodiment of the present invention, and other embodiments, modifications and variations of the present invention are contemplated within the spirit and scope of the invention as would be apparent to one with ordinary skill in the pertinent technology.

What is claimed is:

1. A motor vehicle having a longitudinal driving direction comprising: a passenger compartment; a windshield frame forwardly of said passenger compartment; a rigid roll yoke rearwardly of and extending transversely across said passenger compartment; detachable covering means for extending from said windshield frame to said roll yoke and substantially completely covering said passenger compartment; forward connecting means for rigidly securing said detachable covering means to said windshield frame; and rearward connecting means for yieldingly connecting the rearward portion of said covering means to said roll yoke for relatively great elastic yielding in both the longitudinal and transverse directions.

2. The device of claim 1, wherein said forward connecting means includes a plurality of rigid longitudinally engaging abutments and at least one force applying latch.

3. The device of claim 2, wherein said latch and abutments are separate and independent from each other and include cooperating elements respectively mounted on said windshield frame and said covering means.

4. The device of claim 3, wherein said windshield frame extends transversely across the vehicle and said abutments are respectively mounted closely adjacent to the extreme opposite transverse sides of said windshield frame.

5. The device of claim 4, wherein each of said abutments includes an interengaging pin and bushing rigidly secured to corresponding ones of said windshield frame and said covering means.

6. The device of claim 5, wherein there are two separate and independent actuatable latches mounted symmetrically on opposite sides of the central vehicle longitudinal plane; said latches are mounted on said covering means; each of said latches has a clamping hook a latch arm and a separate and independent safety hook, each of which engage said windshield frame; each of said latches includes a manually operable lever drivingly connected to a shaft having cam means for moving said clamping hook into and out of clamping engagement with said windshield frame during movement of said lever in one direction, and rigid stop means for abutting against said latch arm to control the alignment of said clamping hook with said windshield frame; said stop means moves said latch arm relative to said windshield frame during movement of said lever in the other direction to allow removal of said safety hook; wherein said rearward connecting means includes longitudinally telescopically interengaging plug in type connectors; wherein said plug in type connectors includes a bushing secured to said covering means and a bolt secured to said roll yoke; including readily elastically yieldable means drivingly connected between said bolt and the side of said roll yoke that is opposite from said covering means; wherein said bolt extends horizontally outwardly from said roll yoke at one end and has a conically forwardly and inwardly tapered free opposite end; wherein said covering means consists of an outer relatively pliable sheet extending over its entire outer surface and a plurality of relatively rigid reinforcement sheets that extend over at least a major portion of the forward and rearward transverse edges of said covering means and are rigidly connected to the corresponding portions of said forward and rearward connecting means; including a first rigid frame member extending along one longitudinal side and a second rigid frame member extending along the opposite longitudinal side; a plurality of collapsible tension members extending transversely of said covering means and having their opposite ends secured to said frame members and being pivotally connected intermediate said opposite ends for collapsing into a folded condition of themselves and said pliable sheet; wherein said covering is reinforced by a plurality of rigid reinforcement sheets extending longitudinally substantially the entire longitudinal dimension of said covering and having a curvature corresponding to the vehicle roof curvature; wherein all of said reinforcement sheets include means for automatically securely clamping them to said tension members in the extended position of said tension members; wherein said reinforcement sheets and said tension members include cooperating relatively rigid tongue and groove means for longitudinally interengaging automatically upon movement of said tension members into their extended position and for preventing relative vertical movement therebetween; said tension members assume an over center position in said extended position with said pivot being outwardly of a line between said opposite ends, and a storage collapsed position with said pivots positioned inwardly of said opposite ends and closely adjacent to the corresponding opposite longitudinal side of said covering means and said tension members vertically overlying one another; only two tension members are provided, one respectively extending along each forward and rearward transverse edge of said covering means; said opposite ends of said tension members being pivotally connected directly to said frame members; said reinforcement sheets being attached to substantially the entire lower area of said pliable sheet except for relatively small longitudinally extending hinge areas of said pliable sheets; said windshield frame member having an aperture for each of said safety hooks and each of said clamping hooks; each of said clamping hooks having its hook portion facing transversely outwardly; each of said latches including a transversely extending latch arm connected to said covering means for pivotal movement in a vertical transverse plane and for limited transverse lost motion; means spring urging each latch arm in one transverse direction away from the vehicle center longitudinal line for moving the corresponding clamping hook portion beneath said windshield frame member and spring means pivotally urging the corresponding hook clamping portion vertically out of engagement with said windshield frame; each of said safety hooks being pivotally mounted on its corresponding latch and including spring means pivotally moving it into engagement with and beneath said windshield frame member; said lever cam means driving through said latch arm to pivotally move said clamping hook out of vertical clamping engagement with said windshield frame and transversely moving said clamping hook inwardly into complete vertical alignment with its corresponding aperture in one direction of rotation of said lever, while simultaneously transeversely moving said latch arm relative to the remaining portions of said latch for pivoting said safety hook out of engagement with said windshield frame; said lever cam means driving through said latch arm to pivotally move said clamping hook upwardly into tight clamping engagement with said windshield frame; said rearward connecting means sleeve having a block of elastomeric material drivingly mounted between it and said covering frame; said rearward connecting means including a screw threaded longitudinal adjustment; said sheet reinforcements consisting of a central substantially rectangular sheet metal portion, and two pairs of substantially rectangular sheet metal portions, each on opposite transverse sides of said central portion and longitudinally aligned; said two sheet metal reinforcements on each transverse side of said central sheet metal reinforcement being beneath said central sheet metal reinforcement and vertically stacked therewith and each other in the collapsed position of said tension members; and said tension members overlying each other and being horizontally between opposite pairs of said sheet metal reinforcements in said collapsed position.

7. The device of claim 1, wherein there are two separate and independent actuatable latches mounted symmetrically on opposite sides of the central vehicle longitudinal plane.

8. The device according to claim 7, wherein said latches are mounted on said covering means.

9. The device according to claim 8, wherein each of said latches has a clamping hook and a separate and independent safety hook, each of which engage said windshield frame.

10. The device according to claim 9, wherein each of said latches includes a latch arm and a manually operable lever drivingly connected to a shaft having cam means for moving said clamping hook into and out of clamping engagement with said windshield frame during movement of said lever in one direction, and rigid stop means for abutting against said latch arm to control the alignment of said clamping hook with said windshield frame.

11. The device of claim 10 wherein said stop means moves said latch arm relative to said windshield frame during movement of said lever in the other direction to allow removal of said safety hook.

12. The device of claim 1, wherein said rearward connecting means includes longitudinally telescopically-interengaging plug-in type connectors.

13. The device of claim 12, wherein said plug-in type connectors include a bushing secured to said covering means and a bolt secured to said roll yoke.

14. The device of claim 13, including readily elastically yieldable means drivingly connected between said bolt and the side of said roll yoke that is opposite from said covering means.

15. The device of claim 14, wherein said bolt extends horizontally outwardly from said roll yoke at one end and has a conically forwardly and inwardly tapered free opposite end.

16. The device of claim 1, wherein said covering means consists of an outer relatively pliable sheet extending over its entire outer surface, and a plurality of relatively rigid reinforcement sheets that extend over at least a major portion of the forward and rearward transverse edges of said covering means and are rigidly connected to the corresponding portions of said forward and rearward connecting means.

17. The device of claim 16, including a first rigid frame member extending along one longitudinal side and a second rigid frame member extending along the opposite longitudinal side; a plurality of collapsible tension members extending transversely of said covering means and having their opposite ends secured to said frame members and being pivotally connected intermediate said opposite ends for collapsing into a folded condition of themselves and said pliable sheet.

18. The device of claim 16, wherein said covering is reinforced by a plurality of rigid reinforcement sheets extending longitudinally substantially the entire longitudinal dimension of said covering and having a curvature corresponding to the vehicle roof curvature.

19. The device of claim 16, wherein all of said reinforcement sheets include means for automatically securely clamping them to said plurality of collapsible tension members in the extended position of said tension members.

20. The device of claim 16, wherein said reinforcement sheets and said tension members include cooperating relatively rigid tongue and groove means for longitudinally interengaging automatically upon movement of said plurality of collapsible tension members into their extended position and for preventing relative vertical movement therebetween.

21. The device of claim 1, wherein there are two separate and independent actuatable latches mounted symmetrically on opposite sides of the central vehicle longitudinal plane.

22. The device of claim 21, wherein each of said latches has an actuatable hook and a separate and independent safety hook, each of which engage said windshield frame.

23. The device of claim 21, wherein said latches are mounted on said covering means.

24. The device of claim 23, wherein each of said latches has a clamping hook, a latch arm and a separate and independent safety hook, each of which engage said windshield frame; each of said latches includes a manually operatable lever drivingly connected to a shaft having cam means for moving said clamping hook into and out of clamping engagement with said windshield frame during movement of said lever in one direction, and rigid stop means for abutting against said latch arm to control the alignment of said clamping hook with said windshield frame; said stop means moves said latch arm relative to said windshield frame during movement of said lever in the other direction to allow removal of said safety hook.

25. The device of claim 1, wherein said covering means consists of an outer relatively pliable sheet extending over its entire outer surface, and a plurality of relatively rigid reinforcement sheets that extend over at least a major portion of the forward and rearward transverse edges of said covering means and are rigidly connected to the corresponding portions of said forward and rearward connecting means.

26. The device of claim 25, including a first rigid frame member extending along one longitudinal side and a second rigid frame member extending along the opposite longitudinal side; a plurality of collapsible tension members extending transversely of said covering means and having their opposite ends secured to said frame members and being pivotally connected intermediate said opposite ends for collapsing into a folded condition of themselves and said pliable sheet.

27. The device of claim 26, wherein said covering is reinforced by a plurality of rigid reinforcement sheets extending longitudinally substantially the entire longitudinal direction of said covering and having a curvature corresponding to the vehicle roof curvature.

28. The device of claim 27, wherein all of said reinforcement sheets include means for automatically securely clamping them to said tension members in the extended position of said tension members.

29. The device of claim 26, wherein said reinforcement sheets and said tension members include cooperating relatively rigid tongue and groove means for longitudinally interengaging automatically upon movement of said tension members into their extended position and for preventing relative vertical movement therebetween.

References Cited
UNITED STATES PATENTS

| | | | |
|---|---|---|---|
| 1,703,395 | 2/1929 | House | 296—137 |
| 3,015,519 | 1/1962 | Barenyi | 296—137 |
| 3,348,877 | 10/1967 | Caramanna | 296—137 |

LEO FRIAGLIA, Primary Examiner

J. A. PEKAR, Assistant Examiner

U.S. Cl. X.R.

280—150; 296—107

UNITED STATES PATENT OFFICE
CERTIFICATE OF CORRECTION

Patent No. 3,494,659　　　　　　　　　　　　　　February 10, 1970

Werner Trenkler

It is certified that error appears in the above identified patent and that said Letters Patent are hereby corrected as shown below:

In the heading to the printed specification, after line 5, insert -- Claims priority, application Germany, May 27, 1966, P 15 80 535.3 --.

Signed and sealed this 17th day of November 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents